US006928491B2

(12) United States Patent
Heffernan (10) Patent No.: US 6,928,491 B2
(45) Date of Patent: Aug. 9, 2005

(54) COMPUTER SYSTEM AND METHOD FOR READING A NETWORK ADDRESS OF A DATA CARRIER FOR ACCESSING A COMMUNICATION NETWORK

(75) Inventor: Peter Heffernan, Chandlers Ford (GB)

(73) Assignee: Sun Microsystems, Inc., Santa Clara, CA (US)

(*) Notice: Subject to any disclaimer, the term of this patent is extended or adjusted under 35 U.S.C. 154(b) by 768 days.

(21) Appl. No.: 09/804,614

(22) Filed: Mar. 12, 2001

(65) Prior Publication Data

US 2002/0023951 A1 Feb. 28, 2002

(30) Foreign Application Priority Data

Aug. 31, 2000 (GB) .............................................. 0021456

(51) Int. Cl.[7] .............................................. G06F 15/16
(52) U.S. Cl. ...................... 709/250; 709/220; 709/216; 710/13; 713/100
(58) Field of Search ................................. 709/250, 220, 709/216, 251; 710/13; 713/100

(56) References Cited

U.S. PATENT DOCUMENTS

| 4,774,399 | A | | 9/1988 | Fujita et al. |
| 5,420,572 | A | | 5/1995 | Dolin, Jr. et al. |
| 5,803,762 | A | | 9/1998 | Green |
| 5,881,235 | A | | 3/1999 | Mills |
| 5,995,965 | A | * | 11/1999 | Experton ...................... 707/10 |
| 6,223,289 | B1 | * | 4/2001 | Wall et al. ................... 713/201 |
| 6,651,110 | B1 | * | 11/2003 | Caspers et al. ................ 710/13 |

FOREIGN PATENT DOCUMENTS

| EP | 0 556 148 | 1/1993 |
| EP | 0 899 925 | 8/1998 |
| GB | 2 338 159 | 12/1999 |
| GB | 2 342 091 | 4/2000 |
| JP | 05091111 | 4/1993 |
| JP | 06-156152 | 7/1994 |
| WO | 98/38761 | 9/1998 |
| WO | 98/57474 | 12/1998 |
| WO | 00/27093 | 5/2000 |

OTHER PUBLICATIONS

European Search Report Application No. GB0101215.2 mailed Mar. 28, 2002.
International Search Report Application No. GB0021456.9 mailed Oct. 30, 2001.
ETSI TS 124 008 v3.4.1, Technical Specification; Global System for Mobile Communications, Jul. 2000, p. 80; XP–000864249.
International search report application No. PCT/US01/25281 mailed Dec. 14, 2001.

* cited by examiner

Primary Examiner—Jeffrey Gaffin
Assistant Examiner—Niketa Patel
(74) Attorney, Agent, or Firm—Meyertons Hood Kivlin Kowert & Goetzel, P.C.; B. Noël Kivlin (57) ABSTRACT

A processing unit connectable to a data communications network has a data carrier reader operable to read a network address from a hand insertable data carrier, wherein the processing unit is operable to use the network address from the data carrier for communicating via the data communications network. A processing unit forming part of a computer system may be readily replaced by a replacement processing unit, and arranged to continue communicating via the communications network, by using the same network address as the original processing unit read from the data carrier. The data carrier may be a Smart card or the like. A method of operating a computer system may therefore comprise connecting the processing unit to a communications network, loading a data carrier into the data carrier reader, arranging for the network address to be read from the data carrier, and arranging for the processing unit to use the network address read from the data carrier to communicate via the network.

26 Claims, 5 Drawing Sheets

COMPUTER SYSTEM AND METHOD FOR READING A NETWORK ADDRESS OF A DATA CARRIER FOR ACCESSING A COMMUNICATION NETWORK

BACKGROUND OF THE INVENTION

The present invention relates to computer systems, and in particular to computer systems having processing units, which are connectable to a communications network via which data may be communicated.

There are many fields in which mankind has become reliant on computers to perform valuable and sometimes essential functions. The reliance on computer systems demands that the down time of a computer system is as small as possible. The down time of a computer system is a period during which a computer system is inoperable as a result of a fault in the system. If a computer system goes down, the inconvenience and loss of revenue caused can be substantial. For example, if a computer system is operating as a server or exchange forming part of a telecommunications system, then during the down time no communications can be performed using the telecommunications system, which can result in a considerable loss of business and therefore revenue for an organization. Computer systems are therefore arranged to be as reliable as possible, so that the down-time is reduced to a minimum. Accordingly, the up-time of a computer system is required to be in the order of 99.9995%, which equates approximately to a down-time of a few seconds per year.

Computer systems are designed and manufactured to standards which reduce as far as possible the likelihood of malfunction. However, in order to minimize any down-time, which may occur as a result of a malfunction, it has been proposed to design parts of the computer system such that the parts can be replaced as quickly as possible with a part which performs the same function. For example, a processing unit, which includes for example a hard-disc drive, can be arranged to be replaceable. The processing unit often forms part of a computer system which executes software processes which control the computer system. As such, when a malfunction occurs in the processing unit, the unit is replaced by an equivalent processing unit. To this end, the hard-disc of the unit is often provided with pre-loaded software which is equivalent to the software processes loaded onto the original hard-disc. The original processing unit may then be repaired off-line, which is particularly advantageous because the repairs can be time consuming.

Computer systems often include, or are arranged to be connectable to a communications network. This can be used to effect communications between different parts of the computer system, the communications network being a local bus, or communications between different computer systems, the communications network being a local area network or the like.

In order to effect replacement of a processing unit, the replacement processing unit should be arranged to communicate via the communications network, in substantially the same way as the original processing unit communicated. In order to minimize down time, it is desirable that the replacement is made as quickly and efficiently as possible.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a processing unit connectable to a data communications network, the processing unit having a data carrier reader operable for reading a network address from a hand insertable data carrier, wherein the processing unit is operable to use the network address from the data carrier for communicating via the data communications network.

Communications networks operable under, for example, an Ethernet protocol or the like, communicate data via a common medium to devices attached to the medium, by appending the data to network addresses which the devices recognise. Each device which is arranged to communicate using a particular network standard such as Ethernet is therefore provided with a unique address, so that the device may communicate via any network conforming to that standard. Typically devices forming part of a computer system are provided with a communications card such an Ethernet card embodying the network address. Once the device has been connected to the communications network, the network address for that device will be used by all other devices connected to the communications network. This is typically arranged by the operating system which receives the network addresses from the devices and passes the addresses via a device tree and stored so as to provide configuration information to enable communication via the network.

As with other devices, processing units are arranged to communicate via a communications network and so are provided with a network address, which is generally embodied within a memory unit of the processing unit. If a processing unit is replaced, by another processing unit, the communications network and the devices connected to the communications network, will not recognise that processing unit and so will be unable to communicate with the processing unit.

The present invention addresses the technical problem of providing an arrangement in which a replacement processing unit may continue communicating via a communications network, by providing a processing unit with a data carrier reader arranged to read a hand insertable data carrier bearing a network address. As such once the original processing unit has been replaced, the replacement processing unit can be arranged to use the network address of the original processing unit by reading this network address from the data carrier through the data carrier reader. The communications network and the other devices connected to the communications network are therefore unaware that the original processing unit has been replaced. The replacement processing unit can continue communicating via the network with the same address as the original processing unit, without any further re-configuration or requirement to recognise a new network address.

It will understood that the invention finds application with a device which is connectable to a communications network and is provided with sufficient processing facility to use the network address from the data carrier rather than a pre-designated address. As such, is will be understood that the term 'processing unit', as used herein refers to and includes any component of a computer system which is connectable to a communications network and is provided with a facility for using a network address read from the data carrier rather than a pre-designated address.

The data carrier reader according to the present invention is arranged to read a hand held and hand insertable data carrier. This means that the data carrier has a form in which a user may manually insert the data carrier into the data carrier reader by hand without the use of a tool or without any adaptation or arrangement which is required to insert the data carrier into the reader by any other means other than with the human hand alone. The data carrier is therefore of a form in which it is readily insertable and removeable by the human hand.

In preferred embodiments, the data carrier may be a memory card having a readable semiconductor memory. The memory card may be a Smart card or the like, the data carrier reader being arranged to receive and read the Smart card. In alternative embodiments, the data carrier may be a Subscriber Identity Module (SIM) card or the like and the data carrier reader may be arranged to receive and read the SIM card.

Although the processing unit may be arranged to use only the network address read from the data carrier, in preferred embodiments, the processing unit may comprise a memory unit operable to store a first network address for use in communicating via the network, and the processing unit may be operable to determined whether the data carrier is present in the reader, and if the data carrier is present in the reader, the processing unit is arranged to use the network address from the data carrier, and otherwise to use the first network address. The processing unit is therefore operable to communicate using a first network address, which may be pre-designated, if the data carrier is not present in the reader, which provides an advantage of optionally communicating with another network into which the processing unit may be connected for test purposes, for example. The processing unit may therefore use the network address from the data carrier, only when the network address is present in the carrier reader.

In an alternative embodiment, the processing unit may comprise a read/writeable register, the processing unit being operable to write the network address into the register from the data carrier reader and to use the network address read from the register for communicating via the network.

The read/writeable register provides the processing unit with a facility for storing the network address read from the data carrier. This provides an advantage in not requiring the presence of the data carrier in the reader in order for the processing unit to have access to the network address. As a result, communications by the processing unit, via the network, will be unaffected if the data carrier is removed from the reader after the data carrier has been read. This provides a degree of security against the unauthorised removal of the data carrier from the reader, because processing units which require the presence of the data carrier in the reader can suffer a disruption in communications if the data carrier is, for example, deliberately or accidentally removed from the reader.

Preferably, in order for the processing unit to read the read/writeable register first, in the case where the register contains the network address read from a data carrier, before attempting to read the data carrier reader in preference to the memory unit, the processing unit comprises a register flag operatively associated with the read/writeable register, wherein the processing unit is operable to set the flag once the network address has been read from the data carrier, and thereafter interrogate the flag and use the network address read from the register if the flag is set. Alternatively, if the flag is not set, the processing unit may read the first address from the memory unit. This arrangement provides an advantage by reading the network address from the read/writeable register first, then the data carrier if present in the data carrier reader and if not the first network address from the memory unit.

In an alternative embodiment, the processing unit may be provided with a security fixing which is arranged to hinder access to a receiving slot through which the data carrier is received by the data carrier reader. As such, the data carrier may be secured in the data carrier reader to hinder unauthorised or accidental removal of the data carrier.

Although the processing unit could be any device within a computer system, which is arranged with a processing facility to replace an assigned network address with an alternative address read from a data carrier, in preferred embodiments the processing unit may comprise a motherboard on which one or more processors are mounted, wherein the data card reader is mounted on the motherboard. Mounting the data carrier reader on the motherboard facilitates access of processors typically mounted on the motherboard to the network address provided by the data carrier. The processing unit can be therefore more easily configured with the network address read from the data carrier.

In other embodiments, the processing unit may be connectable to first and second networks, wherein the network address read from the data carrier comprises two addresses, a first of the two addresses being used to communicate via the first network, and a second of the two addresses being used to communicate via the second network.

In preferred embodiments, the processing unit may be replaceably mountable in a chassis arranged to receive the processing unit. If the processing unit malfunctions, then the processing unit can be readily replaced with a corresponding replacement processing unit, which is exchanged with the original processing unit in the chassis.

According to an aspect of the present invention, there is provided a method of operating a computer system comprising connecting a processing unit to a communications network, said processing unit having a data carrier reader; loading a data carrier into said data carrier reader, said data carrier having recorded thereon a network address for use in communicating via said network; arranging for the network address to be read from the data carrier; and arranging for said processing unit to use said network address read from said data carrier to communicate via said network.

According to another aspect of the present invention there is provided a device for use in a computer system, the device being connectable to a data communications network, the device having a data carrier reader operable to read a network address from a hand insertable data carrier, wherein the device is operable to use the network address from the data carrier for communicating via the data communications network.

According to another aspect of the present invention there is provided a data carrier having recorded on a readable medium a network address for use in a device connectable to a communications network via which communications may be arranged using the network address read from the data carrier.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
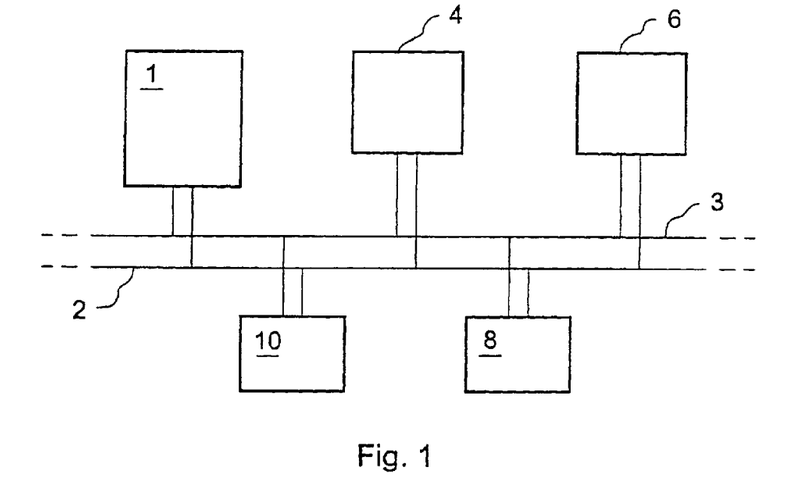
FIG. 1 is a schematic block diagram of a computer system.

A somewhat simplified block diagram of a computer system is shown in FIG. 1. In FIG. 1 a processing unit 1 is shown connected to a data communications network 2. Also connected to the data communications network 2 is a further processing unit 4, and other peripheral devices including a printer 6 and further workstations 8, 10. It will be appreciated that these are just examples of devices communicating via the data communications networks and other servers connected to other DTE equipment may be also communicate data via the network. Accordingly the data communications network may be a LAN, WAN or the Internet.

Figure 2:
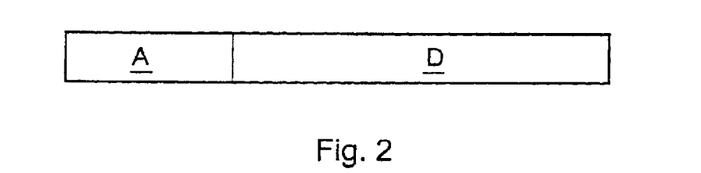
FIG. 2 is an illustrative representation of an Ethernet data packet.

The computer system shown in FIG. 1 is provided as an example only. However the computer system shown in FIG. 1 illustrates an arrangement in which devices are designed to communicate data via a data communications network 2. The data communications network 2 may operate in accordance with an Ethernet protocol in which data is communicated via an Ethernet cable which provides a common medium through which all devices connected to the medium can receive and transmit data. Data to be communicated to a particular one of the devices connected to the network is detected and received by that device by an Ethernet address appended to the data. A conceptual diagram of the structure of an Ethernet packet is shown in FIG. 2 where a first field A represents the address of the device to receive the data and a second field D represents the data being communicated.

The computer system may also include a second communications network 3, which may be provided for reasons which will be explained shortly.

The present invention finds application in facilitating communications via a data communications network, in particular, where a device coupled to the network is replaced by another replacement device. Any one of the devices shown in FIG. 1 may be a device embodying the present invention. However as an illustration the processing unit 1 will be used in the following description as a device embodying the invention.

Figure 3:
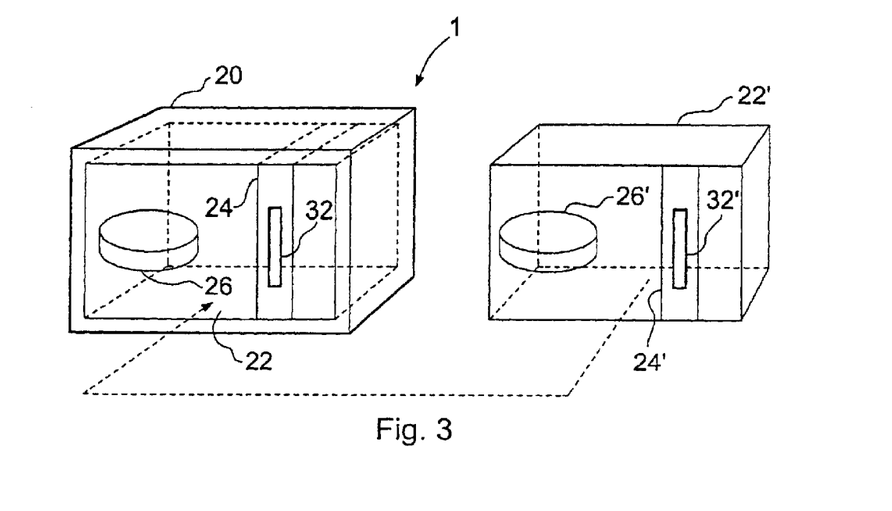
FIG. 3 is an aspect view of a schematic representation of a processing unit which is replaceably mountable within a chassis.

In FIG. 3 processing unit 1 is shown to comprise a chassis 20 in which there is replaceably mounted a processing unit 22. The processing unit 22 is shown to include a motherboard 24 and a hard disk drive 26 although it will be appreciated that the processing unit 1 may comprise other parts which are not shown in FIG. 3.

The present invention finds particular application when a device has malfunctioned and must be replaced in order to, as far as possible, minimise the down time of the computer system. To this end the processing unit 1 shown in FIG. 3 is arranged so that if a malfunction occurs, the processing unit 22 may be removed and replaced by a corresponding processing unit $22^1$ which performs an equivalent function. As such the hard disk 26 may include identical software to that loaded onto the hard disk of the original processing unit 22. Thus, as indicated by the arrow 28, the replacement unit $22^1$ can be slotted in place of the original processing unit 22 and arranged to perform the same function of the original processing unit thereby minimising the down time.

As already explained, a technical problem addressed by embodiments of the present invention is to provide an arrangement in which the replacement processing unit $22^1$ may continue communicating using the data communications network 2 without requiring a reconfiguration of the network. This is because an operating system running on the processing unit receives the network addresses of each device in the computer system via device tree. The network addresses of the devices are usually maintained for each of the devices by the operating system, unless and until the network is re-configured. The addresses of the devices connected to the network are established once by the operating system, using the device tree. Thereafter to effect communication via the network, the same network address for a particular device is always used.

Conventionally devices to be connected to a communications network are provided with a unique network address from the manufacturer which is fixed throughout the lifetime of the component. As a result the device may be connected to any data communications network conforming to the same standard for which the device has been configured to effect data communications. However, when one device is replaced by another, communications via the data communications network can not be made, because the replacement device will have a different network address from that of the original device.

Embodiments of the present invention provide an arrangement in which data communications via the network can continue after a device has been replaced. This arrangement provides continued communications, without the devices comprising the computer system having to change the address to which data destined for that device is communicated, which would be required if the network were to be re-configured.

As shown in FIG. 3, the motherboard 24 includes a data carrier reader having a receiving gap 32 through which a data carrier may be received and read by the data carrier reader. A better understanding of the arrangement of the motherboard 24 is provided through an illustration of an example embodiment shown in FIG. 4 where parts also appearing in FIG. 3 bear the same numerical designation.

Figure 4:
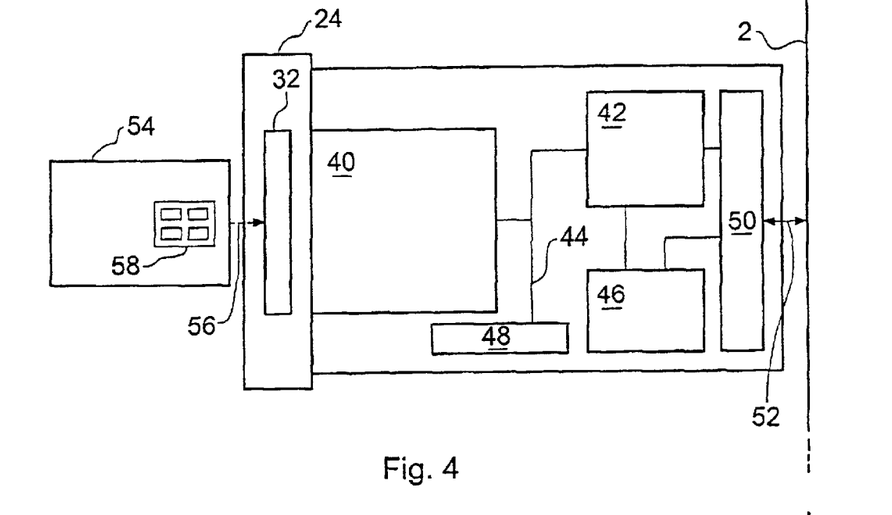
FIG. 4 is a part aspect view, part block diagram of a motherboard forming part of an example processing unit, shown in FIG. 3, embodying the present invention.

In FIG. 4 the motherboard 24 has a data carrier reader 40 which is connected to a CPU 42 on the motherboard via a local bus 44. The local bus 44 may be for example an I²C bus. The motherboard also includes a non-volatile random access memory 46 also connected to the CPU 42. The motherboard 24 also includes a boot programmable read only memory (PROM) 48 which is connected via the I²C bus 44 to the CPU 42 and communications port 50 which is connected via connector 52 to the data communications network 2. Also shown in FIG. 4 is a data carrier 54 which is illustrated by an arrow 56 to be received in the data carrier reader 40.

The data carrier in the example embodiment of the present invention is a Smart card which includes a Read Only Memory (ROM) 58 in which a network address to be used by the processing unit, is pre-stored. However it will be appreciated that the smart card 54 is only one example of a data carrier which is hand held and hand insertable into and removable from the reader 40 and other embodiments may use other data carriers such as a Subscriber Identity Module (SIM) or the like, or a MEMORY STICK (RTM) or the like.

The operation of the embodiment of the invention shown in FIG. 4 will now be explained. In order to provide a facility through which the replacement processing unit $22^1$ may use the same network address as the original processing unit 22, data representing the network address is pre-stored in the Smart card 54. As such, when the processing unit 22 is replaced, the Smart card 54 may be removed from the smart card reader 40 on the motherboard 24 and introduced into the corresponding smart card reader 40 of the motherboard 24 in the replacement processing unit $22^1$.

Following power-up of the computer system 1, the CPU 42 on the motherboard reads instructions from the boot PROM 48. In accordance with these instructions the CPU 42 operates to interrogate the Smart card reader 40 via the I²C bus 44 to ascertain whether or not a Smart card is present in the Smart card reader 40. If the Smart card is present, the CPU 42 operates to read the network address from the Smart card 54 and to configure the communications port 50 with this network address. The address is then passed to the operating system which updates a device tree providing a list of the network addresses of the devices connected to the network, with this address. Thereafter, data communications are effected via the data communications network 2 through the link 52 using the address supplied from the Smart card 54.

Accordingly, it will be appreciated that for the network 2 and the other devices 4, 6, 8, 10 communications are unaffected, and apart from the period during which the original processing unit 22, is replaced by the processing unit 22', communications via the network are substantially uninterrupted.

In the event however that the Smart card 54 is not present in the reader 40, the CPU 42 reads a first network address from the Non-Volatile RAM 46. The Non-Volatile RAM 46 is arranged to store the first network address which is pre-designated and pre-loaded into the Non-Volatile RAM 46 by the manufacturer of the motherboard 24. Therefore, in the event that the Smart card 54 is not present in the Smart card reader 40 then the first network address from the Non-Volatile RAM 46 is used by the motherboard to communicate via the network 2.

Figure 5:
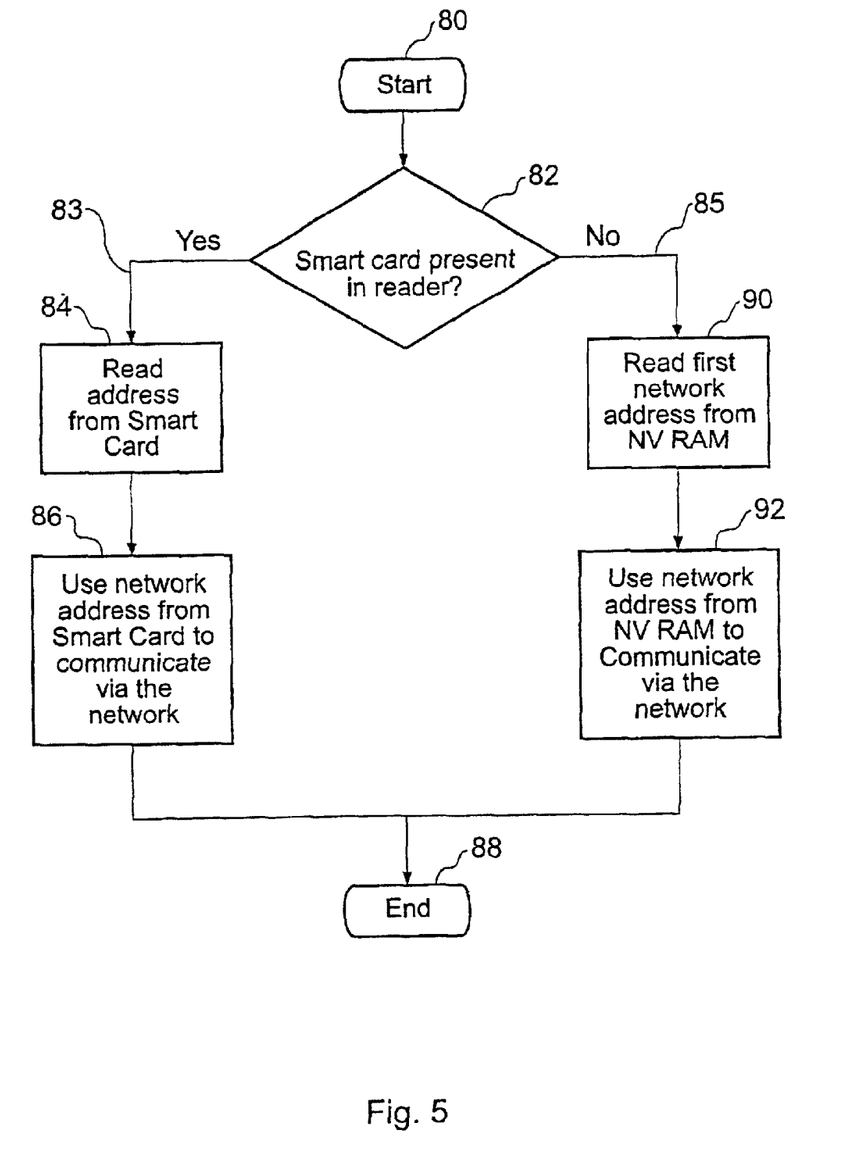
FIG. 5 is a flow diagram representative of the operation of the processing unit according to FIG. 4.

The operation of the CPU 42 on reading the code in the boot PROM 48 is summarised by the flow diagram shown in FIG. 5. In FIG. 5 at the start of the process 80 the CPU reads the boot PROM 48 and performs the following steps. At decision step 82 the CPU determines whether there is a Smart card present in the Smart card reader 40. If the Smart card is present then the CPU operates at step 84 to read the network address from the Smart card. At process step 86 the CPU configures the communications port 50 to use the network address from the Smart card to communicate via the network. At this point the process terminates 88. If the Smart card is not present in the Smart card reader then the CPU operates to read the first network address from the Non-Volatile RAM (NV RAM) 46 at process step 90. The CPU then operates to use the first network address from the NV-RAM 46 to configure the communications port 50 to communicate using the first address via the communications network 92. The process then terminates 88.

Figure 6:
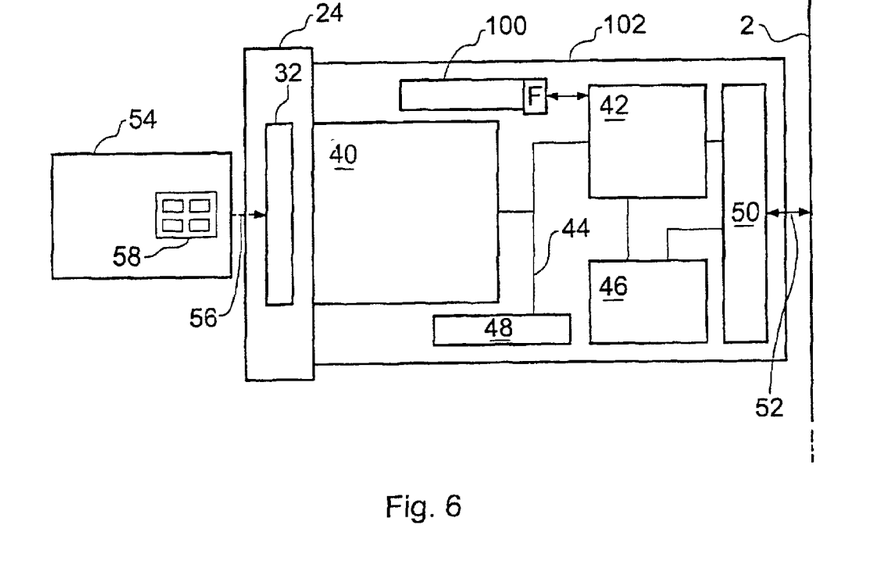
FIG. 6 is a part aspect view, part block diagram of a motherboard forming part of a further example processing unit shown in FIG. 3, embodying the present invention.

A second embodiment of the present invention is shown in FIG. 6 in which parts which also appear in FIG. 4 are given the same numerical references. The second embodiment shown in FIG. 6 corresponds substantially to the embodiment shown in FIG. 4 so only the differences between the first and second embodiments will be explained.

In addition to the components shown in FIG. 4 on the motherboard 24, the motherboard $24^1$ shown in FIG. 6 also includes a network address register 100 which includes a register set flag 102. The network address register 100 could form part of the CPU 42 or may also form part of the communications port 50. The network address register 100 is used to store the network address read from the smart card 54. Once the address has been read from the smart card 54 then the register set flag 102 will be set to indicate that there is a network address present in the register 100 by setting the flag accordingly to, for example, F=1. The network address register 100 provides a further advantage according to the second embodiment in that the network card may be removed from the network card reader 40 after the network address has been successfully read by the CPU 42. Thereafter upon system initialisation, as before the CPU reads the initialisation code from the boot PROM 48. For the second embodiment however the boot PROM 48 includes initialisation code which instructs the CPU to determine whether the register flag 102 is set. If the register flag is set (F=1) then the CPU 42 reads the network address from the register 100 and configures the communications port 50 as before with this network address. If the register flag 102 is not set (F=0) then the CPU operates to determine whether the Smart card 54 is present in the Smart card reader 40. If it is present then as before the CPU reads the network address from the Smart card and configures the communications port 50 accordingly. However, in addition the CPU 42 then writes the network address from the Smart card into the network address register 100 and sets the register flag 102 to indicate the presence of the address (F=1). Thereafter, the CPU will read the network address form the address register 100 rather than the Smart card reader therefore providing greater flexibility of not requiring the presence of the Smart card 54 in the reader 40. Furthermore, an advantage is provided in that should the Smart card 54 be unintentionally or deliberately (as a result of a mischievous act) removed from the Smart card reader 40 then the processing unit 22 may continue operating with the correct network address without the presence of the Smart card 54.

As before in the event that no Smart card is present in the Smart card reader 40 then the CPU precedes to read the NV RAM 46 for the first network address and configures the communications port accordingly.

Figure 7:
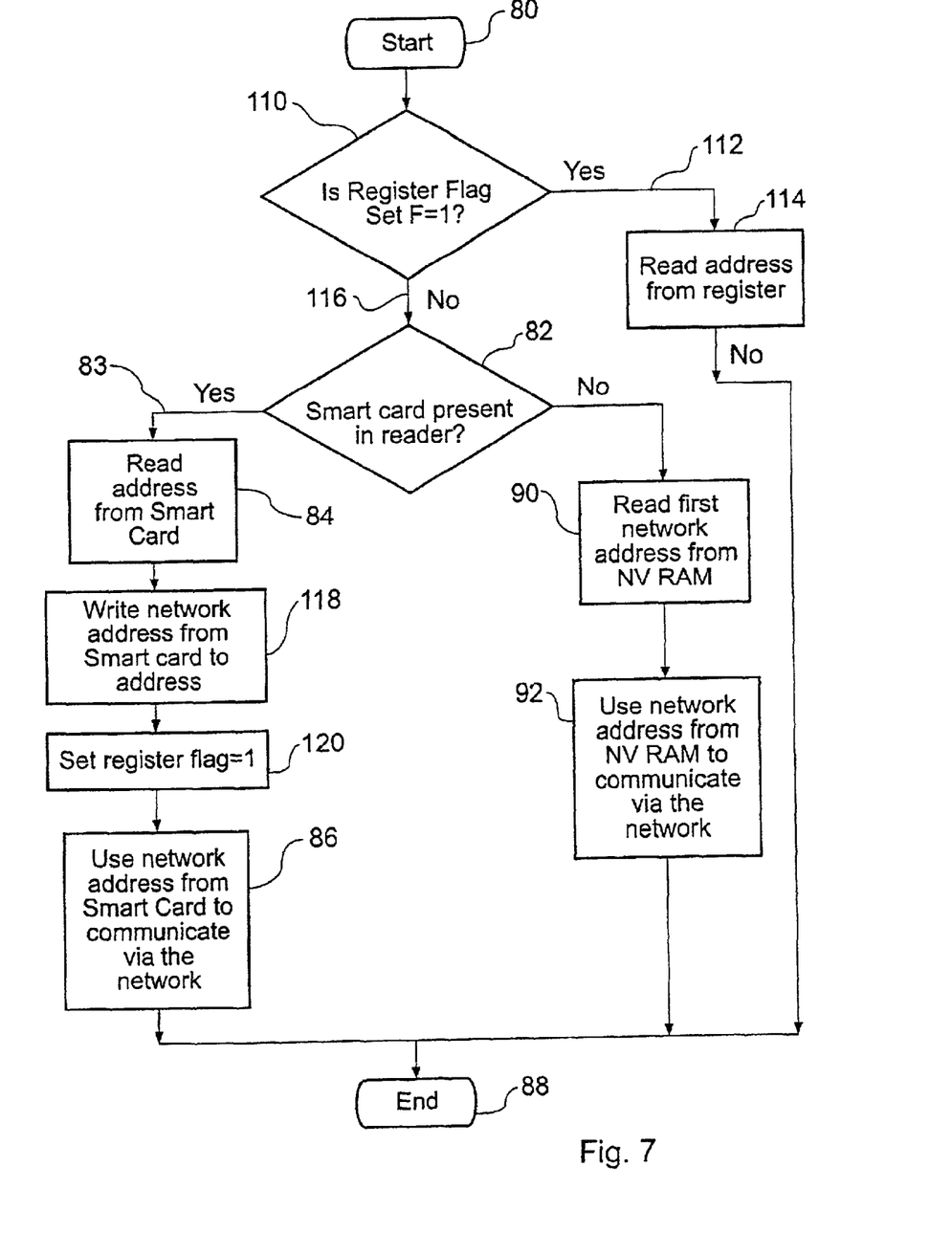
FIG. 7 is a flow diagram representative of the operation of the processing unit according to FIG. 6.

The operation of the second embodiment of the present invention is summarised by the flow diagram shown in FIG. 7. The process steps shown in the flow diagram 7 which also appear in the flow diagram of FIG. 5 are provided with the same numerical references. Correspondingly, only the different steps according to the second embodiment will be explained. Following the start of the initialisation process in which the CPU 42 reads the initialisation code from the boot PROM 48, the CPU 42 is instructed to determine whether the register flag 102 is set (F=1). This is represented by decision step 110. If the flag is set then decision path 112 is followed and the CPU 42 then reads the network address from the register 100 and configures the communications port 50 accordingly. This is represented by process 114. Processing then terminates 88. If however the register flag is not set (F=0) then decision path 116 is followed. Decision path 116 then feeds into the decision step 82 in which the CPU ascertains whether or not the smart card is present in the reader. If the smart card is not present then processing continues with process steps 90, 92 and terminates at step 88 as in FIG. 6. If however the Smart card is present in the reader then decision path 83 is followed and the CPU reads the network address from the Smart card 54. The CPU 42 then writes the Smart card address into the address register 100 at process step 118. The CPU then sets the register flag to indicate the presence of the address (F=1) 120. Processing then proceeds with process step 86 and terminates at process 88 as with FIG. 6.

Once the CPU 42 has read the boot PROM 48 and configured the communications port 50 with the network address, the CPU probes all the devices and passes the results of the probe to the operating system via a device tree. In an alternative embodiment of the present invention, the network address which may be a MAC address may be over written into the NV RAM. As will be appreciated the address of the processing unit comprising the motherboard is particularly important to the computer system because this represents the root level MAC address of the computer system.

In alternative embodiments of the present invention, the processing unit may be provided with more than one communications port for connection to more than data communications network. This is shown in FIG. 1 as the second communications network 3. This may be provided on the motherboard in order to increase redundancy so that if one communications networks should fail then data communications may be made via the other communications network. This may also be required in order to increase the band width which may be communicated to the motherboard. Another reason for providing two networks would be to allow for two separate networks to be established. One network may be used for system administration and one for network communications, which may include internet access. The administration may be performed by a management network. Therefore the communications port is arranged to provide multiple Ethernet ports through which data may be communicated in parallel. Accordingly, the Smart card for this further embodiment will include a second network address for use in communicating via the second network, and the NV RAM may include a second initial network address.

Figure 8:
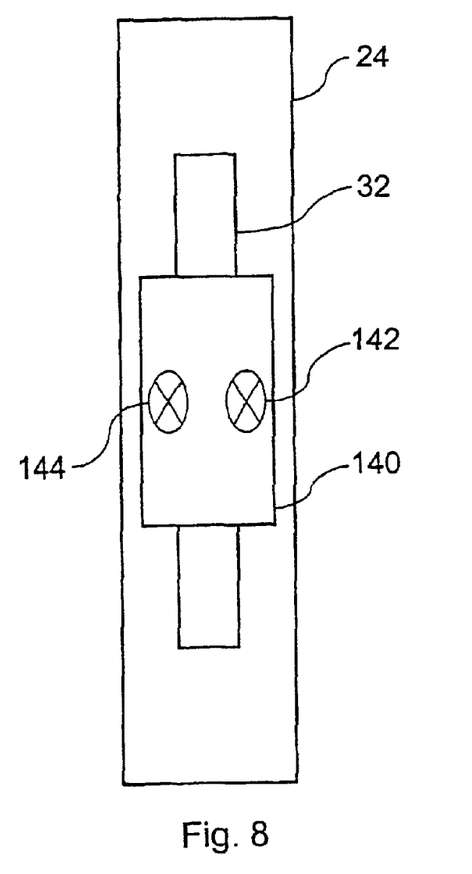
FIG. 8 is a schematic diagram illustrating an arrangement of a data carrier reader mounted on a motherboard.

A further aspect of the present invention is illustrated in FIG. 8 where parts also appearing in FIG. 4 bear the same numerical references. In FIG. 8 the front of the motherboard 24 in which the receiving slot 32 formed is shown to include a security barrier 140 which covers the front of the receiving slot 32 of the motherboard 24 so as to obstruct the receiving slot 32. The barrier 140 is secured in place by fixing screws 142, 144 which may be shaped and configured to prevent removal of the fixing screws 142, 144 without provision of a correspondingly configured removing tool. The arrangement of the barrier 140 and the fixing screws 142, 144 is provided to prevent the Smart card 54 from being removed from the Smart card reader 40. Alternatively, for the embodiment shown in FIG. 6 the barrier 140 and fixing screws 144, 142 are arranged to prevent an incorrect Smart card being introduced into the Smart card reader 40 after the motherboard has already been configured with the correct network address which has been loaded into the address register 100.

Figure 9:
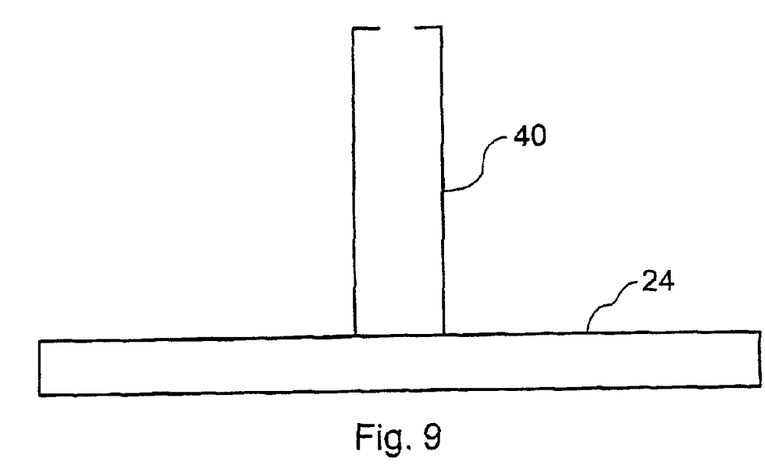
FIG. 9 is a schematic diagram illustrating a security fixing on a receiving slot of a data carrier reader.

Although the Smart card reader 40 shown in FIG. 4 and 6 is mounted with the plane of the Smart card substantially parallel to the plane of the motherboard, alternative arrangements are possible and will be determined by the mechanical requirements for mounting the Smart card reader on the motherboard. As such an alternative arrangement is shown in FIG. 9 in which the smart card reader 40 is mounted perpendicularly to the plane of the motherboard 24.

As will be appreciated by those skilled in the art various modifications may be made to the embodiments herein before described without departing form the scope of the present invention. In particular, although the embodiment of the present invention has been described for an application in which the processing unit is replaceably mounted in a chassis, it will be appreciated that in other embodiments, the processing unit may be any device which is connectable to a communications network. It will be appreciated that in other embodiments the network address is provided to such devices through a Smart card and a Smart card reader. As will be appreciated, also, the Smart card is one example of a data carrier which also includes SIM cards and MEMORY STICKS (RTM) and the like. The term Smart card is therefore used to refer to a data carrier which may have memory only and should not be interpreted as being limited to a card with an processing unit.

What is claimed is:

1. A processing unit connectable to a data communications network, said processing unit comprising:
  a memory unit operable to store a first network address for use in communicating via said network; and
  a data carrier reader operable to read a second network address from a hand insertable data carrier, wherein said processing unit is operable to use said second network address from said data carrier for communicating via said data communications network;
  wherein said processing unit is operable to determine whether said data carrier is present in said reader, and wherein said processing unit is also operable to use said second network address from said data carrier if the data carrier is present in said reader and otherwise to use said first network address.

2. A processing unit as claimed in claim 1, wherein said processing unit is operable to use said second network address from said data carrier only when said second network address is present in said carrier reader.

3. A processing unit as claimed in claim 1, further comprising a read/writeable register, wherein said processing unit is operable to write said second network address read from said data carrier by said data carrier reader into said register and to use said second network address read from said register for commutating via said network.

4. A processing unit as claimed in claim 3, further comprising a resister flag operatively associated with said read/writeable register, wherein said processing unit is operable to set said flag once said second network address has been read from said data carrier, and wherein said processing unit is operable to interrogate said flag and to use said second network address for communicating via said network if said flag is set.

5. A processing unit as claimed in claim 4, wherein if said flag is not set said processing unit is operable to determine whether said data carrier is present in the reader, if said data carrier is present in the reader said second network address is read from said data carrier and said flag is set, and if said data carrier is not present in the reader said processing unit is operable to read said first network address from said memory unit for use in communicating via said network.

6. A processing unit as claimed in claim 1, wherein said data carrier is a Smart card and said data carrier reader is a smart card reader.

7. A processing unit as claimed in claim 1, wherein said data carrier is a Subscriber Identity Module (SIM) card and said data carrier reader is a SIM card reader.

8. A processing unit as claimed in claim 1, further comprising a motherboard on which one or more processors are mounted, wherein said data card reader is mounted on said motherboard.

9. A processing unit as claimed in claim 1, wherein said processing unit is connectable to first and second networks, wherein the second network address read from said data carrier comprises two addresses, a first of said two addresses being used to communicate via said first network, and a second of said two addresses being used to communicate via said second network.

10. A processing unit as claimed in claim 1, wherein said processing unit is replaceably mountable in a chassis arranged to receive said processing unit.

11. A processing unit as claimed in claim 1, wherein said data carrier reader includes a securing mechanism to hinder removal of said data carrier when present in said reader.

12. A processing unit as claimed in claim 1, wherein the data carrier includes a recordable medium and the second network address is recorded on the recordable medium.

13. A computer system comprising:
a communications network for providing data communications to devices connected to said network; and
a processing unit including:
a memory unit operable to store a first network address for use in communicating via said network, and
a data carrier reader operable to read a second network address from a hand insertable data carrier, wherein said processing unit is operable to use said second network address from said data carrier for communicating via said data communications network;
wherein said processing unit is operable to determine whether said data carrier is present in said reader, and wherein said processing unit is also operable to use said second network address from said data carrier if the data carrier is present in said reader and otherwise to use said first network address.

14. A computer system as claimed in claim 13, comprising a computer including a chassis in which said processing unit is replaceably mountable.

15. A method of operating a computer system comprising:
connecting a processing unit to a communications network, said processing unit including a memory unit and a data carrier reader, wherein the memory unit is operable to store a first network address for use in communicating via said network;
said processing unit determining whether a hand insertable data carrier is present in said reader, wherein said data carrier having recorded thereon a second network address for use in communicating via said network; and
said processing unit using said second network address from said data carrier if the data carrier is present in said reader and otherwise using said first network address.

16. A method as claimed in claim 15, further comprising:
if said data carrier is present in said reader, said data carrier reader reading said second network address from said data carrier, and
said processing unit writing said second network address read from said data carrier by said data carrier reader into a read/writeable register and using said second network address read from said register for communicating via said network.

17. A method as claimed in claim 16, further comprising:
said processing unit setting a register flag operatively associated with said read/writeable register once said second network address has been read from said data carrier, and
said processing unit interrogating, said flag and using said second network address for communicating via said network if said flag is set.

18. A method as claimed in claim 17, further comprising:
if said flag is not set said processing unit determining whether said data carrier is present in the reader, if said data carrier is present in the reader reading said second network address from said data carrier and setting said flag, and if said data carrier is not present in the reader said processing unit reading said first network address from said memory unit for use in communicating via said network.

19. A method as claimed in claim 15, wherein said processing unit is replaceable, and said connecting a processing unit to a communications network comprises:
disconnecting a first processing unit from said communications network, and
connecting a second replacement processing unit to said communications network in place of said first processing unit.

20. A device for use in a computer system, said device being connectable to a data communications network, said device comprising:
a memory unit operable to store a first network address for use in communicating via said network; and
a data carrier reader operable to read a second network address from a hand insertable data carrier, wherein said processing unit is operable to use said second network address from said data carrier for communicating via said data communications network;
wherein said processing unit is operable to determine whether said data carrier is present in said reader, and wherein said processing unit is also operable to use said second network address from said data carrier if the data carrier is present in said reader and otherwise to use said first network address.

21. A device as claimed in claim 20, wherein said device is operable to use said second network address from said data carrier only when said second network address is present in said carrier reader.

22. A device as claimed in claim 20, further comprising a read/writeable register, wherein said processing unit is operable to write said second network address read from said data carrier by said data carrier reader into said register and to use said second network address read from said register for communicating via said network.

23. A device as claimed in claim 22, further comprising a register flag operatively associated with said read/writeable register, wherein said processing unit is operable to set said flag once said second network address ms been read from said data carrier, and wherein said processing unit is operable to interrogate said flag and to use said second network address for communicating via said network if said flag is set.

24. A device as claimed in claim 23, wherein if said flag is not set said processing unit is operable to determine whether said data carrier is present in the reader, if said data carrier is present in the reader said second network address is read from said data carrier and said flag is set, and if said data carder is not present in the reader said processing unit is operable to read said first network address from said memory unit for use in communicating via said network.

25. A device as claimed in claim 20, wherein said data carrier is a Smart card or the like and said data carder reader is a Smart card reader.

26. A device as claimed in claim 20, wherein said data carrier is a Subscriber Identity Module (SIM) card or the like and said data carrier reader is a SIM card reader.

* * * * *